United States Patent
Owen

(10) Patent No.: US 8,203,747 B2
(45) Date of Patent: Jun. 19, 2012

(54) METHODS AND SYSTEMS FOR TIME-EFFICIENT PRINT-DATA RENDERING

(75) Inventor: James E. Owen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1126 days.

(21) Appl. No.: 12/052,040

(22) Filed: Mar. 20, 2008

(65) Prior Publication Data

US 2009/0237734 A1 Sep. 24, 2009

(51) Int. Cl.
*G06F 15/00* (2006.01)
*G06K 1/00* (2006.01)
*H04N 1/60* (2006.01)

(52) U.S. Cl. .......................................... 358/1.8; 358/1.9

(58) Field of Classification Search ........................ None
See application file for complete search history.

(56) References Cited

U.S. PATENT DOCUMENTS

| | | |
|---|---|---|
| 4,630,306 A | 12/1986 | West et al. |
| 4,817,172 A | 3/1989 | Cho |
| 4,998,211 A | 3/1991 | Hamada et al. |
| 5,081,594 A | 1/1992 | Horsley |
| 5,193,126 A | 3/1993 | Matsuki |
| 5,388,166 A | 2/1995 | Onozawa |
| 5,828,380 A | 10/1998 | Lin |
| 6,005,586 A | 12/1999 | Morita et al. |
| 6,057,825 A | 5/2000 | Takakura et al. |
| 6,072,501 A | 6/2000 | Bier |
| 6,466,229 B1 | 10/2002 | Nagao |
| 6,480,631 B2 | 11/2002 | So et al. |
| 6,608,627 B1 | 8/2003 | Marshall et al. |
| 7,113,191 B2 | 9/2006 | Lake et al. |
| 7,139,099 B2 | 11/2006 | Hashizume et al. |
| 7,324,229 B2 | 1/2008 | Kumar et al. |

(Continued)

FOREIGN PATENT DOCUMENTS

JP 2002-334341 A 11/2002

(Continued)

OTHER PUBLICATIONS

Japanese Office Action—Patent Application No. 2009-066401—Mailing Date Jun. 21, 2011.
Japanese Office Action—Patent Application No. 2009-066401—Mailing Date Mar. 29, 2011.

(Continued)

*Primary Examiner* — Douglas Tran
(74) *Attorney, Agent, or Firm* — Kristine Elizabeth Matthews; David C. Ripma

(57) ABSTRACT

Aspects of the present invention relate to systems and methods for generating rendered data for printing. According to a first aspect of the present invention, a master stencil may be formed from individual print-object stencils. The master stencil may provide a mapping such that rendered print data may be generated at a pixel without multiple renditions at each pixel for each print object. According to a second aspect of the present invention, the master stencil may provide a mapping such that processing operations may be minimized at each pixel. According to a third aspect of the present invention, individual print-object stencils may be processed serially at each line, or spatial portion. Print-object stencils may be processed in z-order for each line, or spatial portion, and pixels which overlap multiple print objects may be overwritten. According to another aspect of the present invention, a master stencil may be generated while rendering print data. Accordingly, print-object stencils may be processed serially in reverse z-order.

25 Claims, 16 Drawing Sheets

U.S. PATENT DOCUMENTS

| | | | |
|---|---|---|---|
| 7,876,332 B1 * | 1/2011 | Donham et al. | 345/619 |
| 7,878,117 B2 * | 2/2011 | Katoh et al. | 101/128.4 |
| 2004/0070791 A1 | 4/2004 | Pattusamy et al. | |
| 2005/0104893 A1 | 5/2005 | Kii et al. | |
| 2006/0192983 A1 | 8/2006 | Groarke et al. | |

FOREIGN PATENT DOCUMENTS

| | | |
|---|---|---|
| JP | 2007-080020 A | 3/2007 |
| JP | 2007-082067 A | 3/2007 |
| WO | 01/37220 A1 | 5/2001 |
| WO | WO-01/37220 A1 | 5/2001 |

OTHER PUBLICATIONS

Michael Abrash, "Ramblings in Realtime," Blue's News, Copyright 2000, http://www.bluesnews.com/abrash.

Werner Lemberg, "New font tools for TEX," TUGboat, vol. 18 (1997), No. 3—Proceedings of the 1997 Annual Meeting, pp. 206-213, Sep. 1997.

David Turner, "How FreeType's rasterizer work," Copyright 2003, http://svn.dsource.org/projects/bindings/trunk/freetype/doc/raster.txt.

* cited by examiner

METHODS AND SYSTEMS FOR TIME-EFFICIENT PRINT-DATA RENDERING

FIELD OF THE INVENTION

Embodiments of the present invention comprise methods and systems for rendering data for printing.

BACKGROUND

Rendering and image processing at resolutions typical in printing may consume considerable time and computational resources, including memory. Generally, these processes may be divided into two categories: geometrical processing and pixel-value processing. Geometrical processing may change the position of a pixel. Exemplary geometrical processing may comprise rendering of vector graphics and glyphs, enlargement or reduction of images, clipping or overlapping of images, which may cut out pixels, and affine transformations, for example, rotation. Pixel-value processing may change the value of a pixel, also considered the pixel value. Exemplary pixel-value processing may comprise color correction, filter processing, halftoning, compression and other image processing techniques.

Typically, geometrical processing methods require a memory buffer comprising memory for all of the pixels, also considered a surface. The surface is accessed one pixel at a time in a non-linear fashion. Surface access may become a limiting factor in performance, particularly in applications that require large amounts of memory. This may be understood in relation to FIG. 1 and FIG. 2.

FIG. 1 depicts an exemplary portion of a document 2, or image, which may be printed. This exemplary portion 2 consists of three graphics elements: a rectangle 4, a circle 6 and a triangle 8. Different shading of these elements in FIG. 1 indicates a different fill for each of these graphics elements 4, 6, 8. Exemplary fills may comprise a gradient fill, a solid fill, a patterned fill, a bitmap fill, a translucency-based fill, a raster operation (ROP) based fill and other types of graphics fills. The fill of each graphics object need not be distinct from the fills of the other objects, but the fills are shown as distinct for clarity in this example. The graphics objects may be defined in a first order by the application that generates the document 2, or image. For this example, by way of illustration and not limitation, consider the order: rectangle 4, circle 6 and triangle 8. The graphics may be processed in the order in which the graphics are defined in the generating application, also considered the z-order. In this situation, the exemplary portion 2 may be rendered according to the following, as depicted in FIGS. 2a-2f.

First, shown in FIG. 2a, a rectangular object stencil 10 may be generated corresponding to the rectangle 4. The object stencil 10 maps the object to pixels in the document. A person of ordinary skill in the art can appreciate the numerous ways of indicating such a mapping. Exemplary mappings may comprise an edge list, a pixel mask, a parametric shape description and other mappings. Next, as shown in FIG. 2b, the corresponding region 12 in a memory buffer 11, also considered a surface, may be filled according to the graphics object, thereby rendering the first graphics object 4. The rectangular stencil 10 may be discarded, because it is no longer required in the rendering process.

A second stencil 14, as shown in FIG. 2c, may be generated corresponding to the next graphics object, the circle 6. Then, as shown in FIG. 2d, the corresponding region 16 in the memory buffer 11 may be filled according to the graphics object, thereby rendering the second graphics object 6. Pixels common to both the rectangle 4 and the circle 6 have been rendered twice at this point. The second stencil 14 may be discarded, because it is no longer required in the rendering process.

A third stencil 18, as shown in FIG. 2e, may be generated for the next graphics object, the triangle 8. As shown in FIG. 2f, the corresponding region 20 in the memory buffer 11 may be filled according to the graphics object, thereby rendering the thirds graphics object 8. Pixels common to the rectangle 4, the circle 6 and the triangle 8 have been rendered three times at this point. The third stencil 18 may be discarded, because it is no longer required in the rendering process. The pixels in the memory buffer have been accessed multiple times in a non-linear order in order to render the graphics objects by serially generating and processing each object stencil.

Some of the image processing steps necessary for printing may vary depending on the combination of graphics (for example, overlapping transparency fills or ROP fills). Rendering data for printing may involve a color-space conversion from the original color space in which the image was created (for example, an RGB color space adjusted for the input device) to an ink color space of the printer (for example, CMYK). If there are translucencies or ROP operations, the print objects must be converted to a standard color space first (for example, sRGB), combined, and only then can the resulting value be converted to the ink color space of the printer.

Some print-data rendering methods may split a surface into bands to deal with the memory constraints. Alternatively, some methods may render into a half-tone space directly, where, for example, a typical half-tone space is one-eighth the size of a corresponding RGB space.

Additional pixel-value processing is typically performed on the surface used for rendering. Memory requirement and memory access constraints may also limit performance of pixel-value processing methods.

Reducing, or eliminating, the requirement of large surfaces and avoiding the bottleneck of memory access may be advantageous in rendering and image processing in printing. Also, avoiding re-filling, or re-rendering, a pixel may be advantageous. Also, avoiding double color-space conversions when not necessary on a pixel may be advantageous.

SUMMARY

Some embodiments of the present invention comprise methods and systems for rendering print data using a master stencil, wherein the master stencil may be formed from individual print-object stencils. The master stencil may provide a mapping such that rendered print data may be generated at a pixel without multiple renditions at each pixel for each print object.

Some embodiments of the present invention comprise methods and systems for rendering print data using a master stencil, wherein the master stencil may be formed from individual print-object stencils. The master stencil may provide a mapping such that processing operations may be minimized at each pixel.

Some embodiments of the present invention comprise methods and systems for rendering print data, wherein individual print-object stencils may be processed serially at each line, or spatial portion. In some of these embodiments, print-object stencils may be processed in z-order for each line, or spatial portion, and pixels which overlap multiple print objects may be overwritten.

Some embodiments of the present invention comprise methods and systems for generating a master stencil while rendering print data. In some of these embodiments, print-object stencils may be processed serially in reverse z-order.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Rendering and image processing at resolutions typical in printing may consume considerable time and computational resources, including memory. Generally, these processes may be divided into two categories: geometrical processing and pixel-value processing. Geometrical processing may change the position of a pixel. Exemplary geometrical processing may comprise rendering of vector graphics and glyphs, enlargement or reduction of images, clipping or overlapping of images, which may cut out pixels, and affine transformations, for example, rotation. Pixel-value processing may change the value of a pixel, also considered the pixel value. Exemplary pixel-value processing may comprise color correction, filter processing, half toning, compression and other image processing techniques.

Typically, geometrical processing methods require a memory buffer comprising memory for all of the pixels, also considered a surface. The surface is accessed one pixel at a time in several passes when rendering graphics objects. This may be described in relation to FIG. 1 and FIG. 2.

Figure 1:
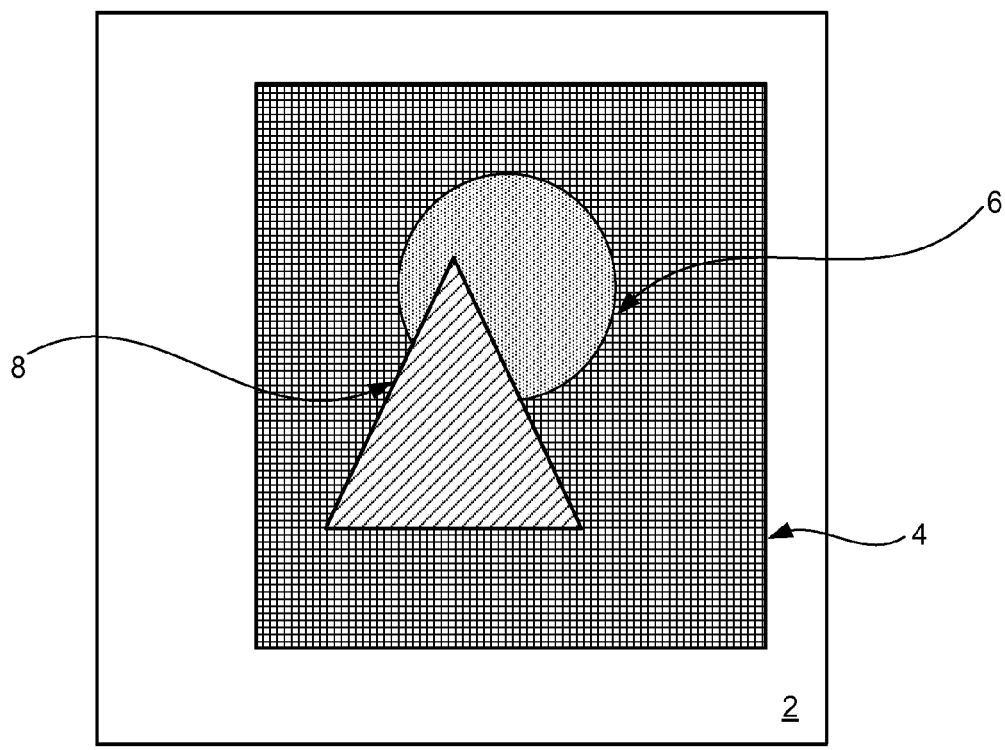
FIG. 1 is a picture showing an exemplary portion of a document or image which may be printed.

FIG. 1 depicts an exemplary portion of a document 2, or image, which may be printed. This exemplary portion 2 consists of three graphics elements: a rectangle 4, a circle 6 and a triangle 8. Different shading of these elements in FIG. 1 indicates a different fill for each of these graphics elements 4, 6, 8. Exemplary fills may comprise a gradient fill, a solid fill, a patterned fill, a bitmap fill, a translucency-based fill, a ROP-based fill and other types of graphics fill. The fill of each graphics object need not be distinct from the fills of the other objects, but the fills are shown as distinct for clarity in this example. The graphics objects may be defined in a first order by the application that generates the document 2, or image. For this example, by way of illustration and not limitation, consider the order: rectangle 4, circle 6 and triangle 8. The graphics may be processed in the order in which the graphics are defined in the generating application, also considered the z-order. In this situation, the exemplary portion 2 may be rendered according to the following, as depicted in FIGS. 2a-2f.

Figure 2A:
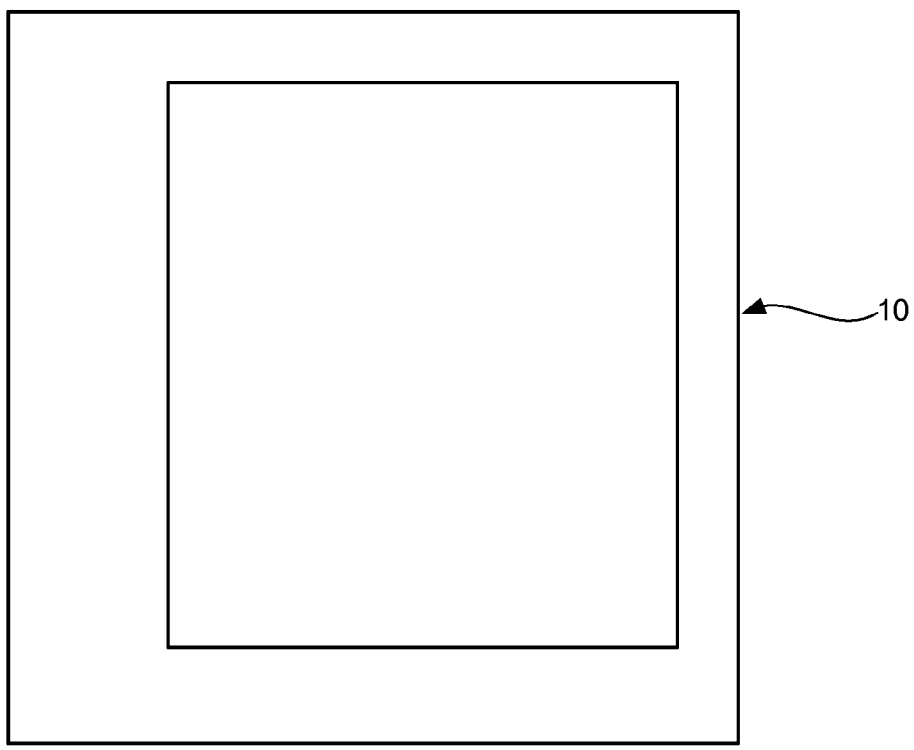
FIG. 2a is a picture showing an exemplary stencil corresponding to a rectangle (prior art)
Figure 2B:
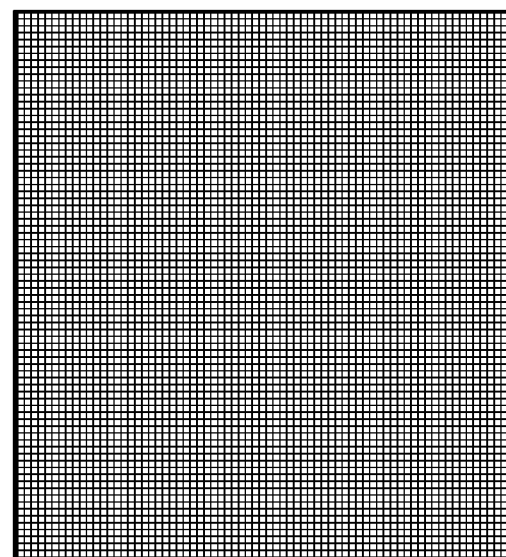
FIG. 2b is a picture showing an exemplary surface on which a rectangle has been rendered (prior art)

First, shown in FIG. 2a, a rectangular stencil 10 may be generated corresponding to the rectangle 4. The object stencil 10 maps the object to pixels in the document. A person of ordinary skill in the art can appreciate the numerous ways of indicating such a mapping. Exemplary mappings may comprise an edge list, a pixel mask, a parametric shape description and other mappings. Next, as shown in FIG. 2b, the corresponding region 12 in a memory buffer 11, also consider a surface, may be filled according to the graphics object, thereby rendering the first graphics object 4. The rectangular stencil 10 may be discarded, because it is no longer required in the rendering process.

Figure 2C:
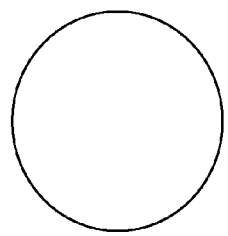
FIG. 2c is a picture showing an exemplary stencil corresponding to a circle (prior art)
Figure 2D:
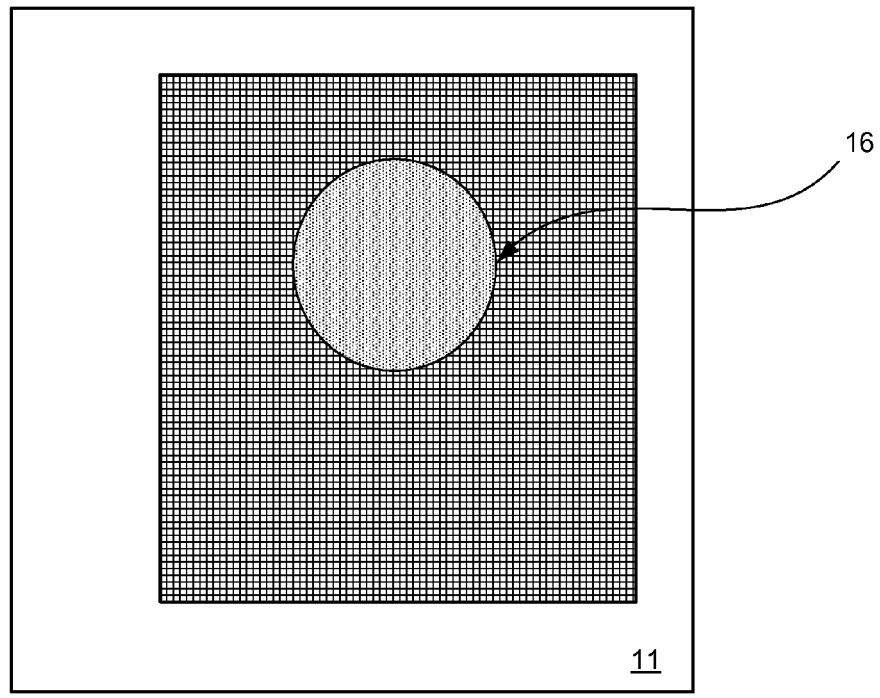
FIG. 2d is a picture showing an exemplary surface on which two graphics objects have been rendered (prior art)

A second stencil 14, as shown in FIG. 2c, may be generated corresponding to the next graphics object, the circle 6. Then, as shown in FIG. 2d, the corresponding region 16 in the memory buffer 11 may be filled according to the graphics object, thereby rendering the second graphics object 6. Pixels common to both the rectangle 4 and the circle 6 have been rendered twice at this point. The second stencil 14 may be discarded, because it is no longer required in the rendering process.

Figure 2E:
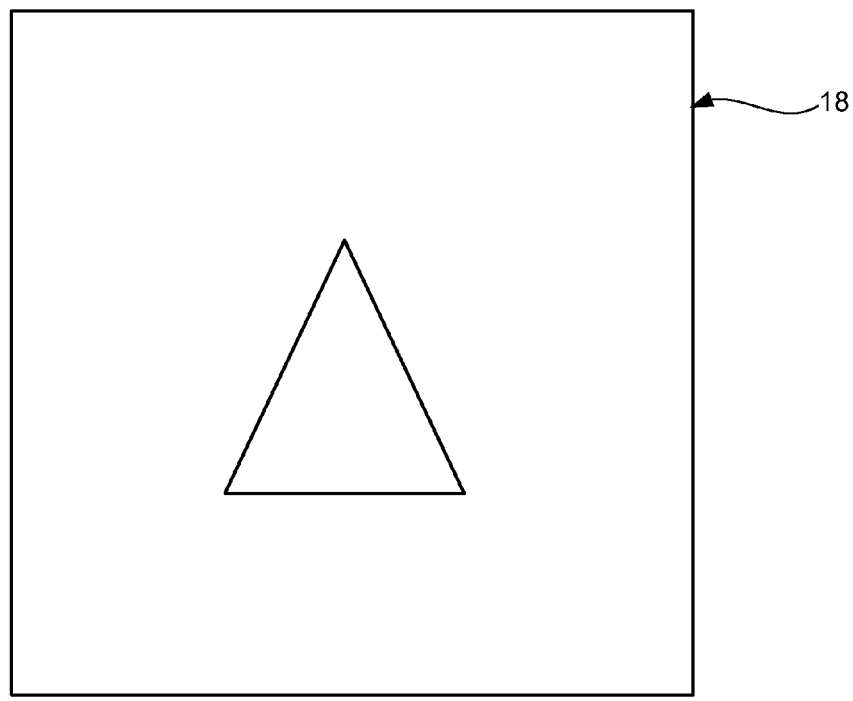
FIG. 2e is a picture showing an exemplary stencil corresponding to a triangle (prior art)
Figure 2F:
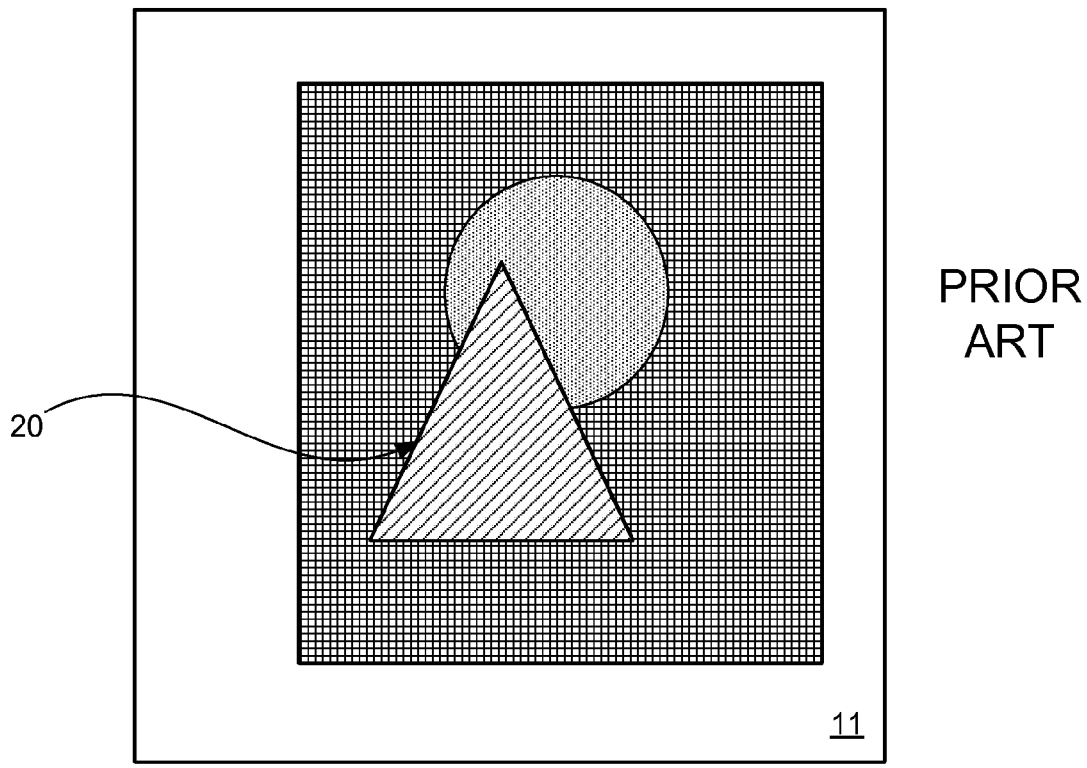
FIG. 2f is a picture showing an exemplary surface on which three graphics objects have been rendered (prior art)

A third stencil 18, as shown in FIG. 2e, may be generated for the next graphics object, the triangle 8. As shown in FIG. 2f, the corresponding region 20 in the memory buffer 11 may be filled according to the graphics object, thereby rendering the thirds graphics object 8. Pixels common to the rectangle 4, the circle 6 and the triangle 8 have been rendered three times at this point. The third stencil 18 may be discarded, because it is no longer required in the rendering process. The pixels in the memory buffer have been accessed multiple times in a non-linear order in order to render the graphics objects by serially generating and processing each object stencil.

Some of the image processing steps necessary for printing may vary depending on the combination of graphics (for example, overlapping transparency fills or ROP fills). Rendering data for printing may involve a color-space conversion from the original color space in which the image was created (for example, an RGB color space adjusted for the input device) to an ink color space of the printer (for example, CMYK). If there are translucencies or ROP operations, the print objects must be converted to a standard color space first (for example, sRGB), combined, and only then can the resulting value be converted to the ink color space of the printer.

Figure 3:
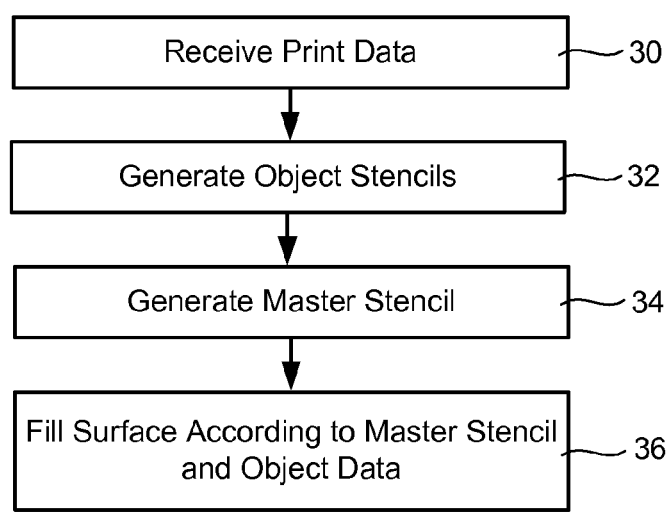
FIG. 3 is a chart showing embodiments of the present invention comprising generating a master stencil from individual object stencils and rendering print data according to the master stencil.
Figure 4A:
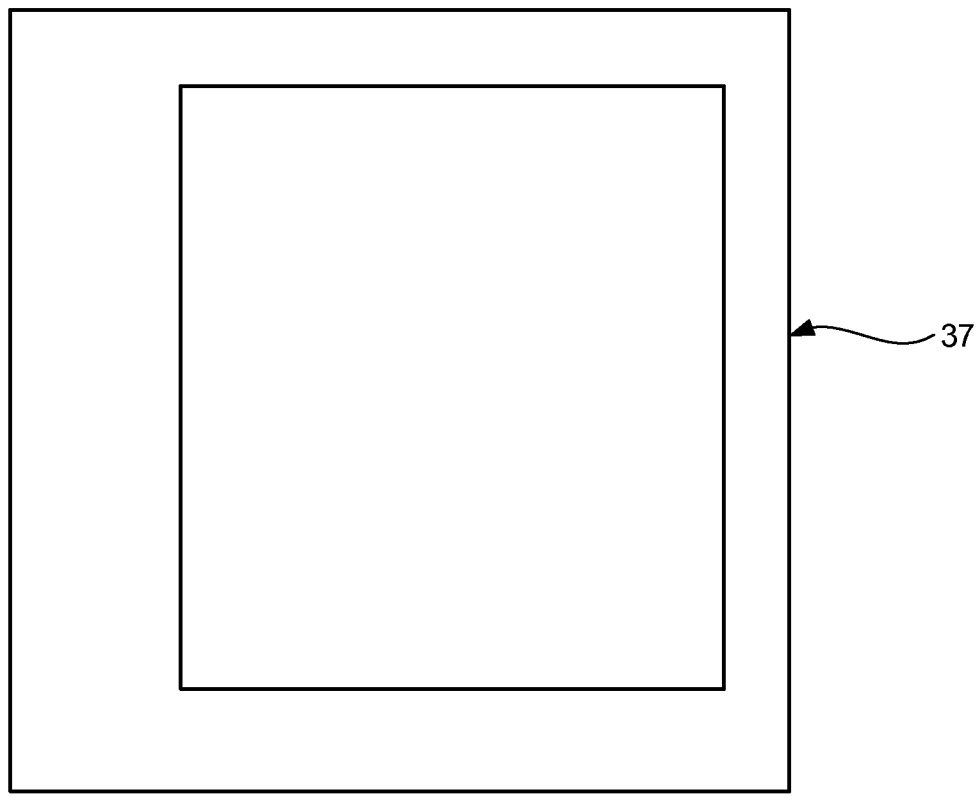
FIG. 4a is a picture showing an exemplary stencil corresponding to a rectangle.
Figure 4B:
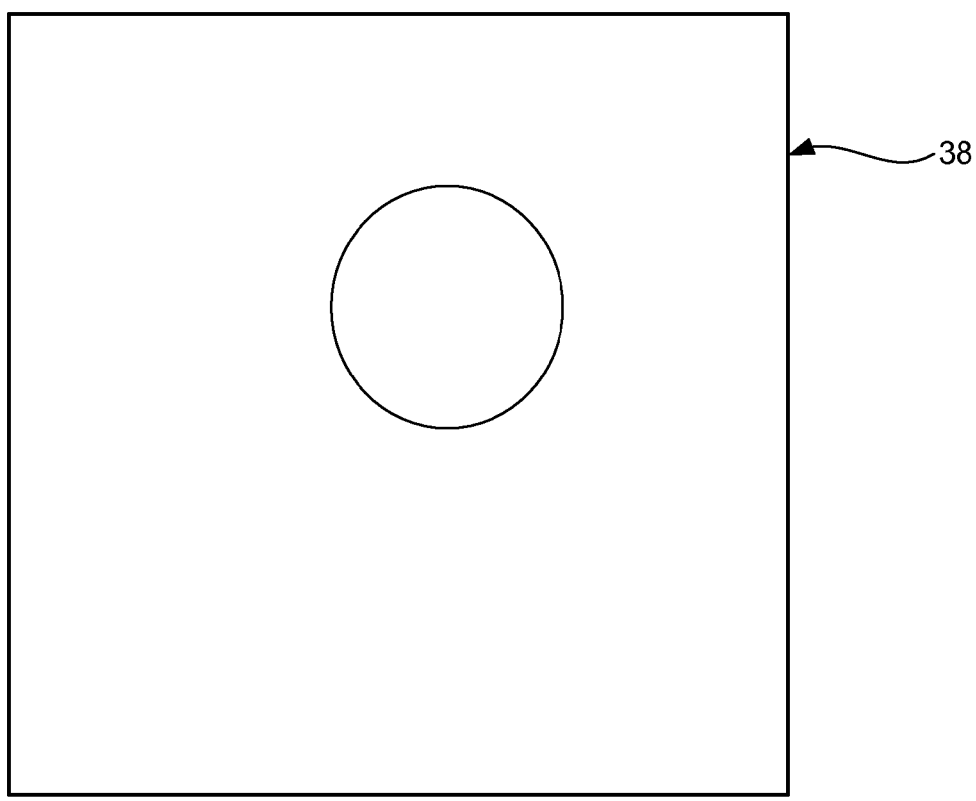
FIG. 4b is a picture showing an exemplary stencil corresponding to a circle.
Figure 4C:
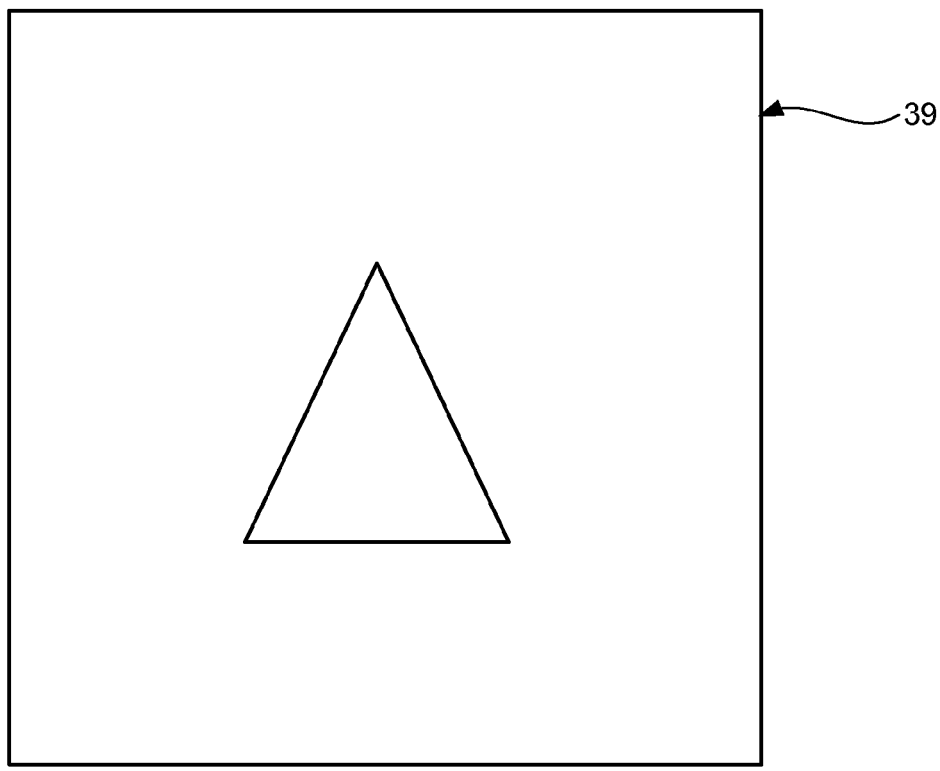
FIG. 4c is a picture showing an exemplary stencil corresponding to a triangle.
Figure 4D:
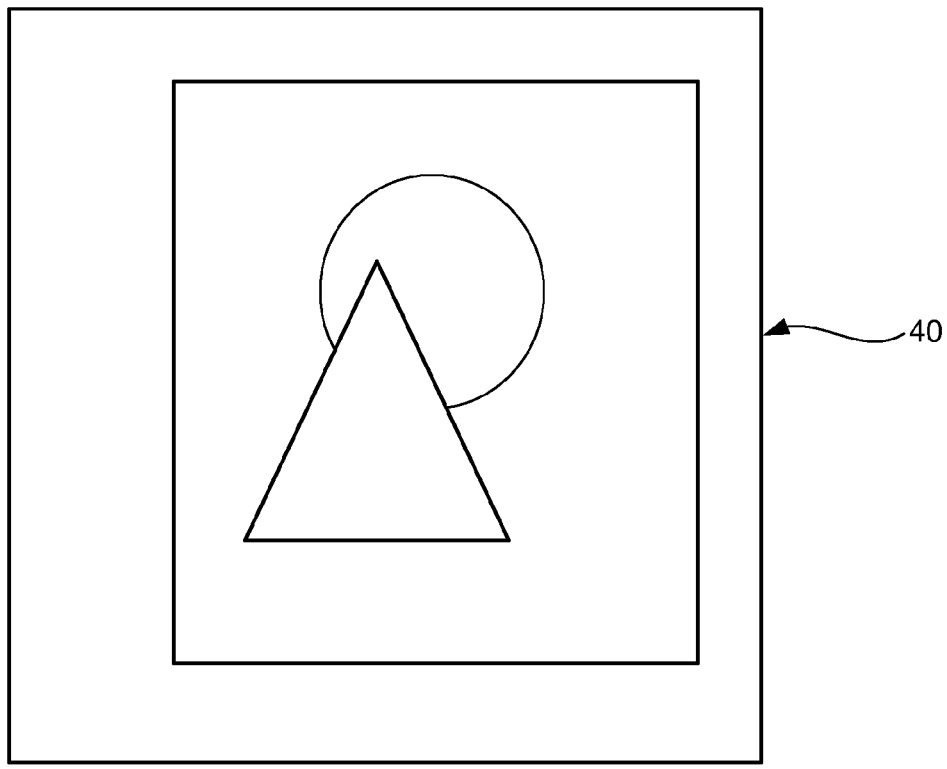
FIG. 4d is a picture showing an exemplary master stencil.
Figure 4E:
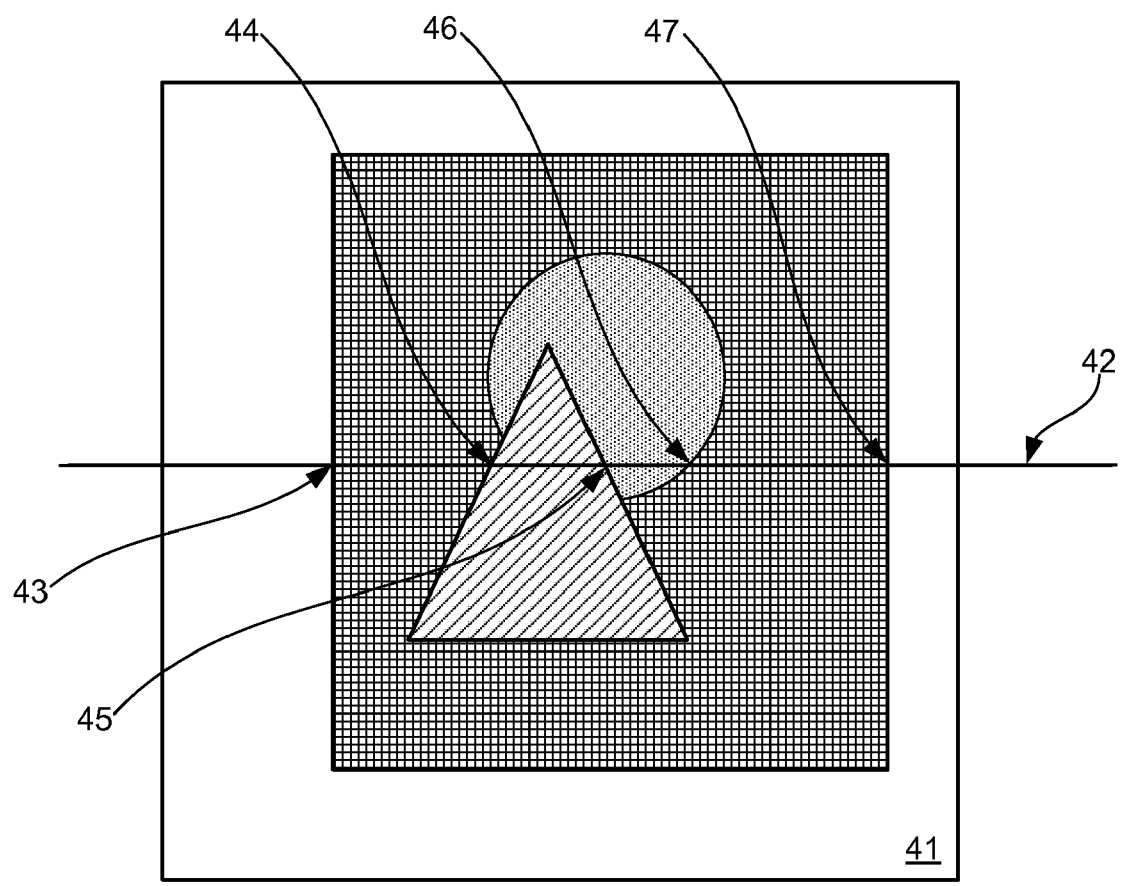
FIG. 4e is a picture showing an exemplary rendering using a master stencil.

Some embodiments of the present invention may be described in relation to FIG. 3. In these embodiments, print data may be received 30. The print data may comprise print objects. Exemplary print objects include graphics objects, print layers and other print objects generated by print-generating applications. In some embodiments of the present invention, an individual object stencil may be generated 32 for each of the print objects. In alternative embodiments, an individual object stencil may be generated 32 for each of some of the print objects. A master stencil may be generated 34 from the individual object stencils. A surface may be filled 36 according to the master stencil and the object data, thereby rendering the print data. In some embodiments, the surface may be filled 36 from top-to-bottom. In alternative embodiments, the surface may be filled 36 from bottom-to-top. In still alternative embodiments, the surface may be filled 36 in another order. In these embodiments of the present invention described in relation to FIG. 3, each pixel in the surface need only be accessed once to render the pixel according to the master stencil. Some of the embodiments of the present invention described in relation to FIG. 3 may be embodied in a printer driver. Alternative embodiments of the present invention described in relation to FIG. 3 may be embodied in printer firmware.

These embodiments may be illustrated in FIGS. 4a-4e using the example described earlier in FIG. 1. Individual object stencils 37, 38, 39, represented in FIGS. 4a-4c, respectively, may be generated for each print object 4, 6, 8. A master stencil 40, represented in FIG. 4d, may be generated from the individual object stencils 37, 38, 39. The surface 41, shown in FIG. 4e, may be filled according to the master stencil 40. This may be illustrated in relation to an exemplary scan line 42. The master stencil may indicate that the scan-line 42 pixels between a first edge 43 and a second edge 44 may be filled according to the print object associated with the rectangle (in this example, the first graphics object). The master stencil may further indicate that the scan-line 42 pixels between the second edge 44 and a third edge 45 may be filled according to the print object associated with the triangle (in this example, the third graphics object). The master stencil may further indicate that the scan-line 42 pixels between the third edge 45 and a fourth edge 46 may be filled according to the print object associated with the circle (in this example, the second graphics object). The master stencil may further indicate that the scan-line 42 pixels between the fourth edge 46 and a fifth edge 47 may be filled according to the print object associated with the rectangle (in this example, the first graphics object).

Figure 5:
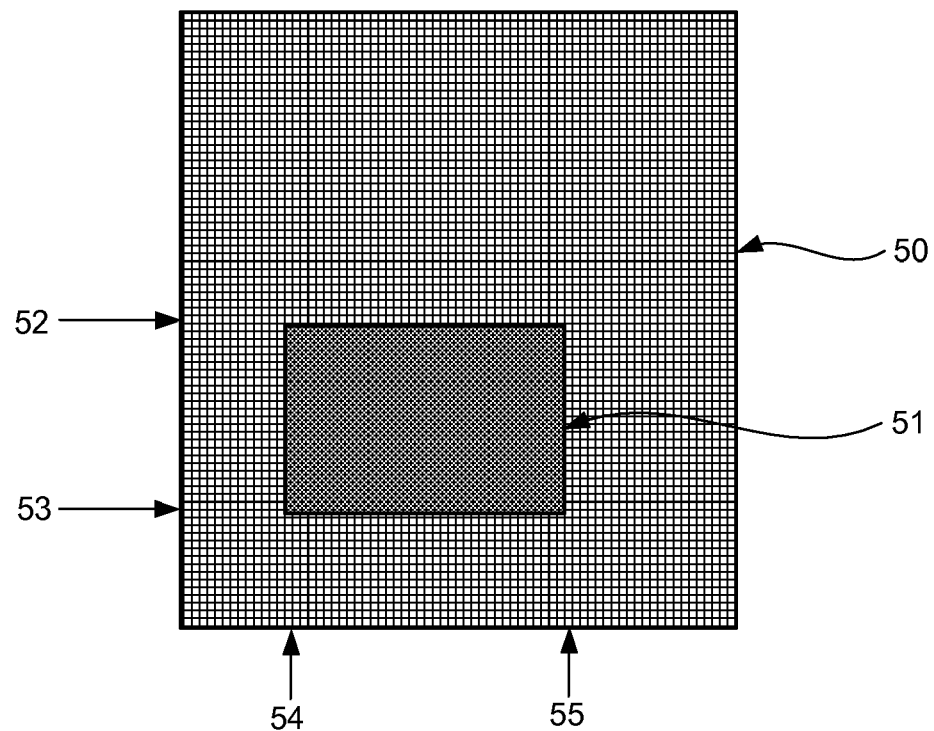
FIG. 5 is a picture showing an exemplary image comprising two rectangular objects.

In some embodiments of the present invention, the master stencil may comprise a mapping of print objects and stencils for each scan line. A person of ordinary skill in the art can appreciate the numerous ways of indicating such a mapping. Several exemplary embodiments may be described in relation to FIG. 5. FIG. 5 consists of two rectangular objects 50, 51, associated with a first print object and a second print object, respectively. For illustrative purposes, let the first rectangular object 50 consist of ten scan lines, each ten pixels wide. Let the second rectangular object 51 be three scan lines by five pixels, starting on the sixth scan line 52 and ending on the eighth scan line 53 between the third 54 and seventh 55 pixels.

In one exemplary embodiment of the present invention, the master stencil may comprise a list corresponding to a pixel scan order wherein each entry in the list indicates the print object associated with the pixel. For the example illustrated in FIG. 5, this may comprise, for a scan-line order of top-to-bottom, a list as follows, wherein "1" indicates the first print object and "2" indicates the second print object:

1 1 1 1 1 1 1 1 1 1 1 1 1 1 1 1 1 1 1 1 1 1 1 1 1 1 1 1 1 1
1 1 1 1 1 1 1 1 1 1 1 1 1 1 1 1 1 1 1 1 1 1 2 2 2 2 2 1 1 1
1 2 2 2 2 2 1 1 1 1 2 2 2 2 2 1 1 1 1 1 1 1 1 1 1 1 1 1 1 1
1 1 1 1 1 1 1 1.

In a second exemplary embodiment of the present invention, the master stencil may comprise a list of scan lines, wherein each scan-line entry comprises a mapping of print objects for the scan line. In some of these embodiments, the mapping may comprise interval listings corresponding to print objects. For the example illustrated in FIG. 5, this may comprise a list as follows:

1 10; 1 10; 1 10; 1 10; 1 10; 1 10; 1 2, 2 5, 1 3; 1 2, 2 5, 1 3; 1 2, 2 5 1 3; 1 10; 1 10, where the first number in each pair indicates the object and the second number indicates the number of pixels in that object and the semicolon indicates a new scan line. There are numerous alternative methods of indicating the same information. For example, if an entire scan line consists of one object, the second number in the pair need not be indicated:

1; 1; 1; 1; 1; 1 2, 2 5, 1 3; 1 2, 2 5, 1 3; 1 2, 2 5 1 3; 1; 1.

In alternative embodiments of the present invention, the master stencil may comprise a binary data structure indicating stencil edges and an associated print-object list, wherein the binary stencil edge data acts as a switch to progress to the next print object listed in the print-object list. For the example illustrated in FIG. 5, the binary stencil-edge data structure may comprise a mask as follows:

0 0 0 0 0 0 0 0 0 0
0 0 0 0 0 0 0 0 0 0
0 0 0 0 0 0 0 0 0 0
0 0 0 0 0 0 0 0 0 0
0 0 0 0 0 0 0 0 0 0
0 0 1 0 0 0 0 1 0 0
0 0 1 0 0 0 0 1 0 0
0 0 1 0 0 0 0 1 0 0
0 0 0 0 0 0 0 0 0 0
0 0 0 0 0 0 0 0 0 0, with an associated print-object list of:

1 2 1 2 1 2 1.

In still alternative embodiments of the present invention, the master stencil may comprise an edge list with a corresponding print-object list. The edge list for the example illustrated in FIG. 5 may be as follows, for scan lines numbered 1 to 10 and pixels numbered 1 to 10:

(5, 3), (5, 8), (6, 3), (6, 8), (7, 3), (7, 8), with an associated print-object list of:

1 2 1 2 1 2 1.

Again, as may be appreciated by one of ordinary skill in the art, there are many additional methods for realizing a master stencil wherein the master stencil comprises a mapping between objects and scan lines.

In some embodiments of the present invention, the fill for a graphics object may be described in relation to other graphics objects with overlapping pixels. These embodiments may be understood in relation to FIG. 6.

Figure 6:
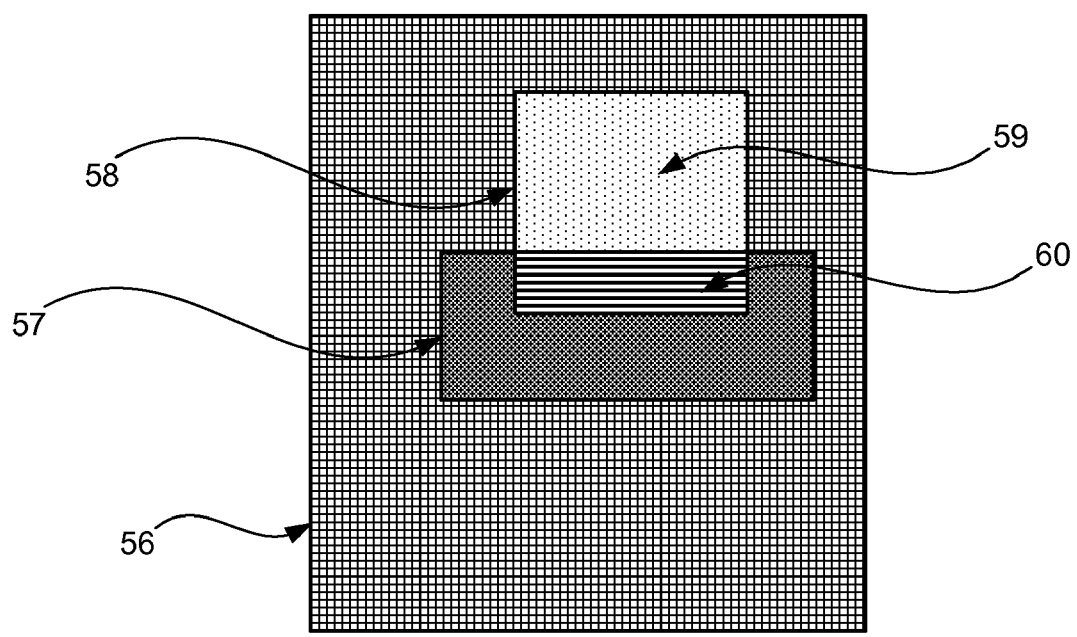
FIG. 6 is a picture illustrating translucency.

FIG. 6 illustrates an exemplary region which comprises three graphics objects corresponding to a first rectangle 56, a second rectangle 57 and a third rectangle 58. The fill value for the third rectangle 58 may be based on the graphics objects associated with the underlying rectangles 56, 57. The fill value at a pixel in the portion 59 of the third rectangle 58 which is only overlapping the first rectangle 56 may be based on a fill value associated with the pixel in the first rectangle 56 and a value associated with the third rectangle 58. The value at a pixel in the portion 60 of the third rectangle 58, which is overlapping both the first rectangle 56 and the second rectangle 57, may be based on the fill values at the corresponding pixels in the graphics object corresponding to the first rectangle 56 and the graphics object corresponding to the second rectangle 57.

In some embodiments, the fill value at a pixel location in a graphics object may be a linear, a logical (for example, a raster operation (ROP)), or other, combination of the fill values at the same pixel location in overlapping graphics objects. In these embodiments, a master stencil may comprise a mapping which associates more than one graphics object at a pixel location. In some embodiments, the mapping may comprise an opacity, scaling, blending or other combining factor for each overlapping graphics object.

Figure 7:
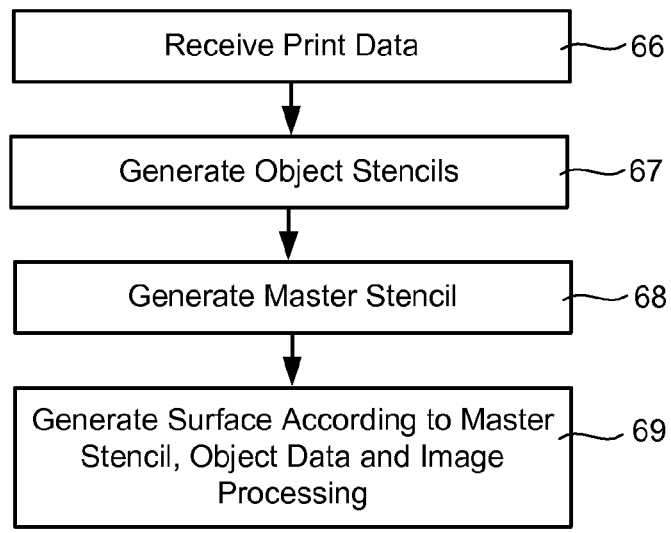
FIG. 7 is a chart showing embodiments of the present invention comprising generating a master stencil from individual object stencils and rendering print data according to the master stencil, object data and pixel-based image processing.

Some embodiments of the present invention may be described in relation to FIG. 7. In these embodiments, print data may be received 66. The print data may comprise print objects. Exemplary print objects include graphics objects, print layers and other print objects generated by print-generating applications. In some embodiments of the present invention, an object stencil may be generated 67 for each of the print objects. In alternative embodiments, an object stencil may be generated 67 for each of some of the print objects. A master stencil may be generated 68 from the object stencils. A surface may be filled 69 according to the master stencil, the object data and pixel-based image processing, thereby rendering the print data. Exemplary pixel-based image processing may include half-tone generation, filter processes, color correction, compression and other image processing techniques. In some embodiments, the surface may be filled 69 from top-to-bottom. In alternative embodiments, the surface may be filled 69 from bottom-to-top. In still alternative embodiments, the surface may be filled 69 in another order. In these embodiments of the present invention described in relation to FIG. 7, each pixel in the surface need only be accessed once to render the pixel according to the master stencil. Some of the embodiments of the present invention described in relation to FIG. 7 may be embodied in a printer driver. Alternative embodiments of the present invention described in relation to FIG. 7 may be embodied in printer firmware.

Figure 8:
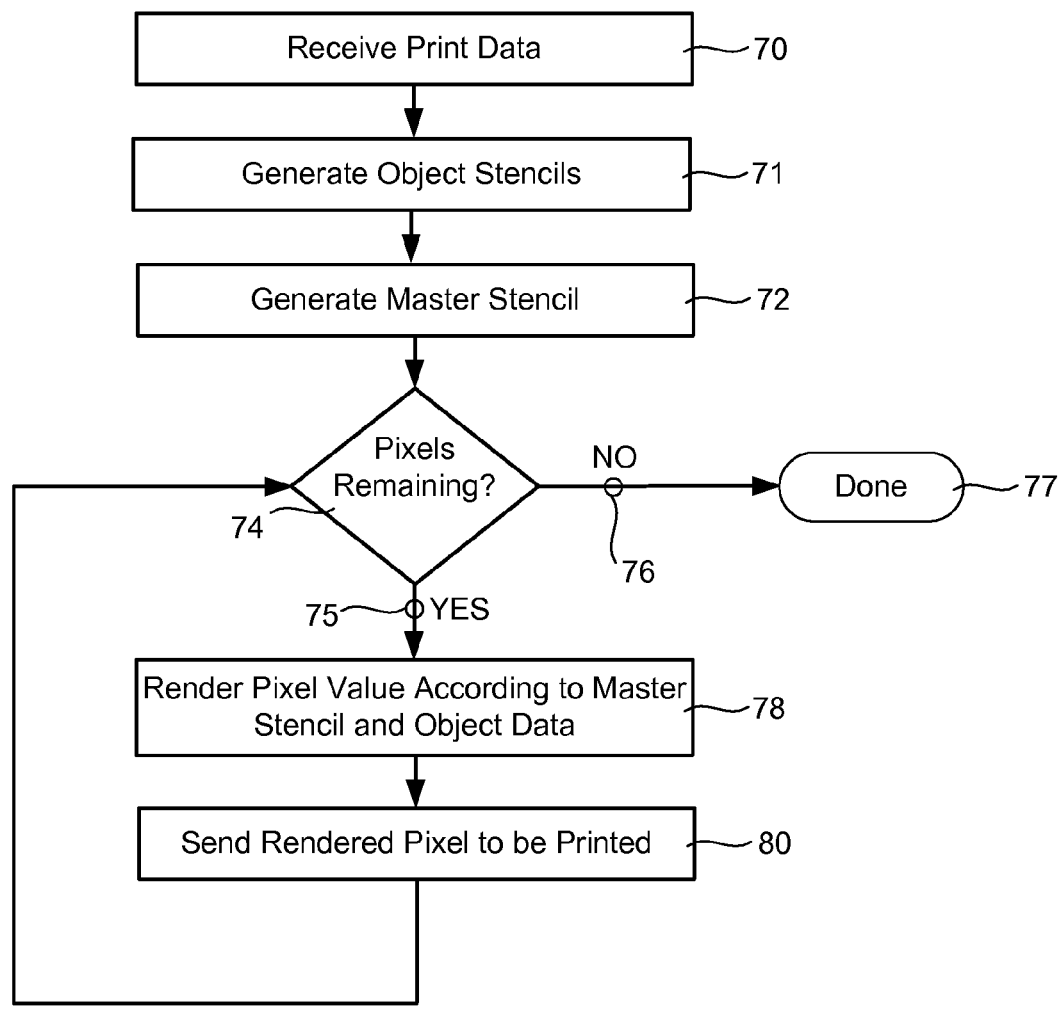
FIG. 8 is a chart showing embodiments of the present invention comprising rendering print data without a surface.

Some embodiments of the present invention, described in relation to FIG. 8, do not require a memory buffer comprising memory for all of the pixels, also considered a surface. In these embodiments, print data may be received 70. The print data may comprise print objects. Exemplary print objects include graphics objects, print layers and other print objects generated by print-generating applications. In some embodiments of the present invention, an object stencil may be generated 71 for each of the print objects. In alternative embodiments, an object stencil may be generated 71 for each of some of the print objects. A master stencil may be generated 72 from the object stencils. It may be determined 74 if there are remaining pixels to be rendered. If there are no more pixels 76 to be rendered, then the process may terminate 77. If there are pixels remaining 75 to be rendered, the next pixel may be rendered 78 according to the master stencil and the object data, thereby rendering print data at the next pixel. The print data may be sent 80 to be printed. The "pixels remaining?" condition 74 may be checked and additional pixels may be rendered and sent to be printed. Some of the embodiments of the present invention described in relation to FIG. 8 may be embodied in a printer driver. Alternative embodiments of the present invention described in relation to FIG. 8 may be embodied in printer firmware.

Figure 9:
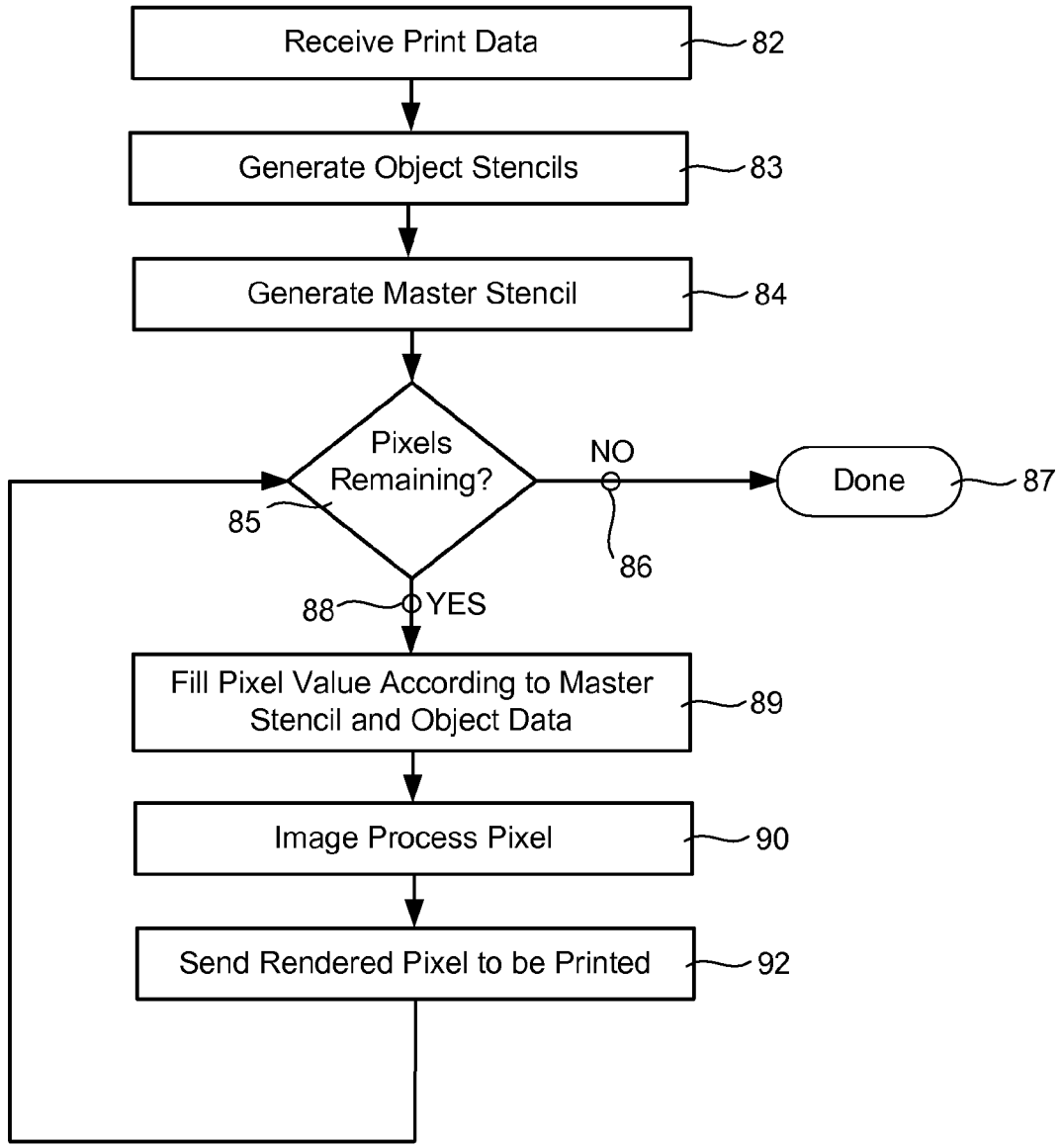
FIG. 9 is a chart showing embodiments of the present invention comprising rendering print data without a surface and further comprising pixel-based image processing without a surface.

Some embodiments of the present invention, described in relation to FIG. 9, do not require a memory buffer comprising memory for all of the pixels, also considered a surface. In these embodiments, print data may be received 82. The print data may comprise print objects. Exemplary print objects include graphics objects, print layers and other print objects generated by print-generating applications. In some embodiments of the present invention, an object stencil may be generated 83 for each of the print objects. In alternative embodiments, an object stencil may be generated 83 for each of some of the print objects. A master stencil may be generated 84 from the object stencils. It may be determined 85 if there are remaining pixels to be rendered. If there are no more pixels 86 to be rendered, then the process may terminate 87. If there are pixels remaining 88 to be rendered, the next pixel may be rendered 89 according to the master stencil and the object data, thereby rendering a filled-pixel value at the next pixel. The filled-pixel value may be processed 90 according to one or more pixel-based image processing operations, thereby producing rendered print data. Exemplary pixel-value processing may comprise color correction, filter processing, halftoning, compression and other image processing techniques. The rendered print data may be sent 92 to be printed. The "pixels remaining?" condition 85 may be checked and additional pixels may be rendered and sent to be printed. Some of the embodiments of the present invention described in relation to FIG. 9 may be embodied in a printer driver. Alternative embodiments of the present invention described in relation to FIG. 9 may be embodied in printer firmware.

Figure 10:
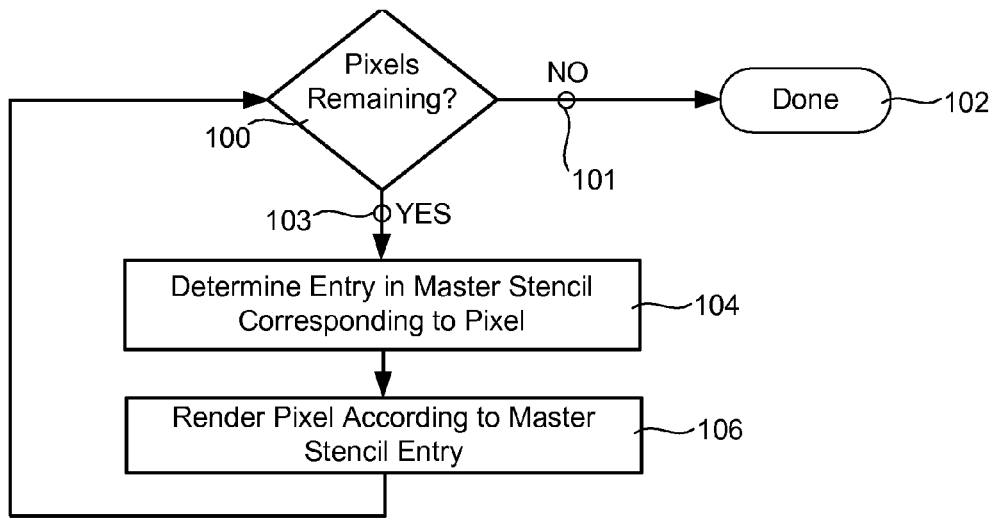
FIG. 10 is a chart showing embodiments of the present invention comprising a master stencil.

Some embodiments of the present invention may be described in relation to FIG. 10. In these embodiments, it may be determined 100 if there are remaining pixels to be rendered. If there are no more pixels 101 to be rendered, then the process may terminate 102. If there are pixels remaining 103 to be rendered, the entry in a master stencil corresponding to the pixel to be rendered may be determined 104. The pixel may be rendered 106 according to the master stencil entry, thereby producing rendered print data. The "pixels remaining?" condition 100 may be checked and additional pixels may be rendered 106. In some embodiments of the present invention, the pixel may be rendered 106 onto a surface. In alternative embodiments, the pixel may be rendered 106 and stored in a register, memory location or other storage location which is not part of a surface. Some of the embodiments of the present invention described in relation to FIG. 10 may be embodied in a printer driver. Alternative embodiments of the present invention described in relation to FIG. 10 may be embodied in printer firmware.

Figure 11:
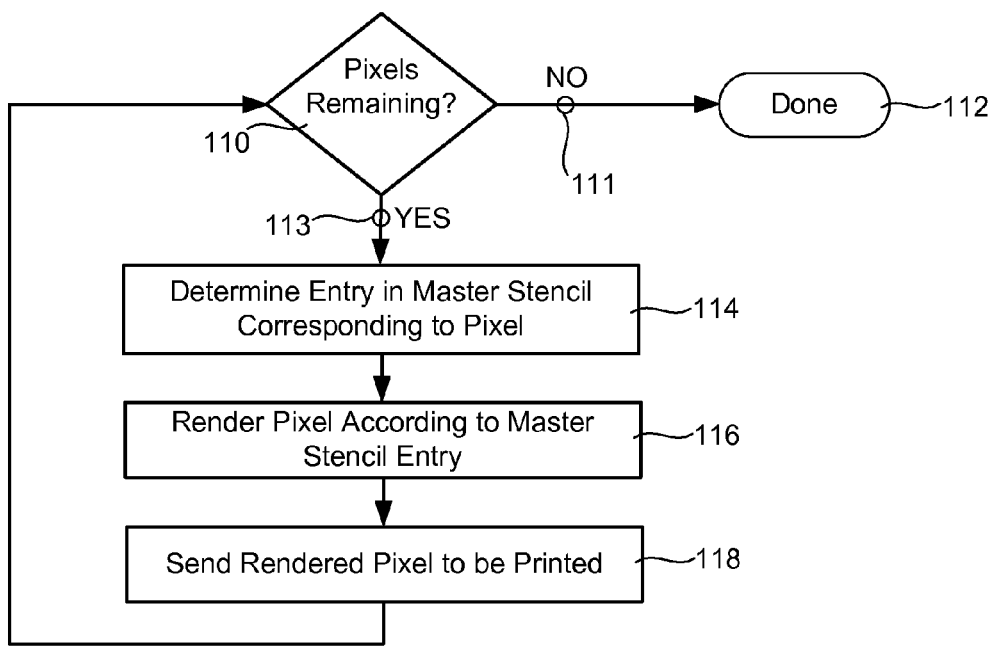
FIG. 11 is a chart showing embodiments of the present invention comprising printing print data generated from a master stencil.

Some embodiments of the present invention may be described in relation to FIG. 11. In these embodiments, it may be determined 110 if there are remaining pixels to be rendered. If there are no more pixels 111 to be rendered, then the process may terminate 112. If there are pixels remaining 113 to be rendered, the entry in a master stencil corresponding to the pixel to be rendered may be determined 114. The pixel may be rendered 116 according to the master stencil entry, thereby producing rendered print data. The rendered print data may be sent 118 to be printed. The "pixels remaining?" condition 110 may be checked and additional pixels may be rendered 116 and sent to be printed 118. Some of the embodiments of the present invention described in relation to FIG. 11 may be embodied in a printer driver. Alternative embodiments of the present invention described in relation to FIG. 11 may be embodied in printer firmware.

Figure 12:
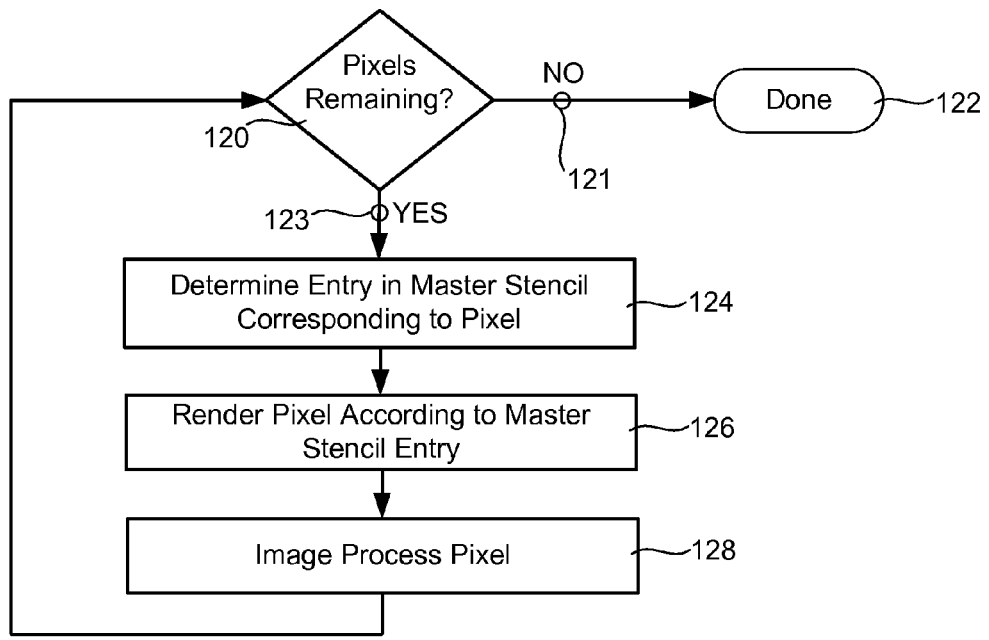
FIG. 12 is a chart showing embodiments of the present invention comprising pixel-based image processing and print data rendering using a master stencil.

Some embodiments of the present invention may be described in relation to FIG. 12. In these embodiments, it may be determined 120 if there are remaining pixels to be rendered. If there are no more pixels 121 to be rendered, then the process may terminate 122. If there are pixels remaining 123 to be rendered, the entry in a master stencil corresponding to the pixel to be rendered may be determined 124. The pixel may be rendered 126 according to the master stencil entry, thereby producing a filled-pixel value. The filled-pixel value may be processed 128 according to one or more pixel-based image processing operations, thereby producing rendered print data. Exemplary pixel-value processing may comprise color correction, filter processing, half toning, compression and other image processing techniques. The "pixels remaining?" condition 120 may be checked and additional pixels may be rendered according to the master stencil and the image processing operations. In some embodiments of the present invention, the pixel may be rendered onto a surface. In alternative embodiments, the pixel may be rendered and stored in a register, memory location or other storage location which is not part of a surface. Some of the embodiments of the present invention described in relation to FIG. 12 may be embodied in a printer driver. Alternative embodiments of the present invention described in relation to FIG. 12 may be embodied in printer firmware.

Figure 13:
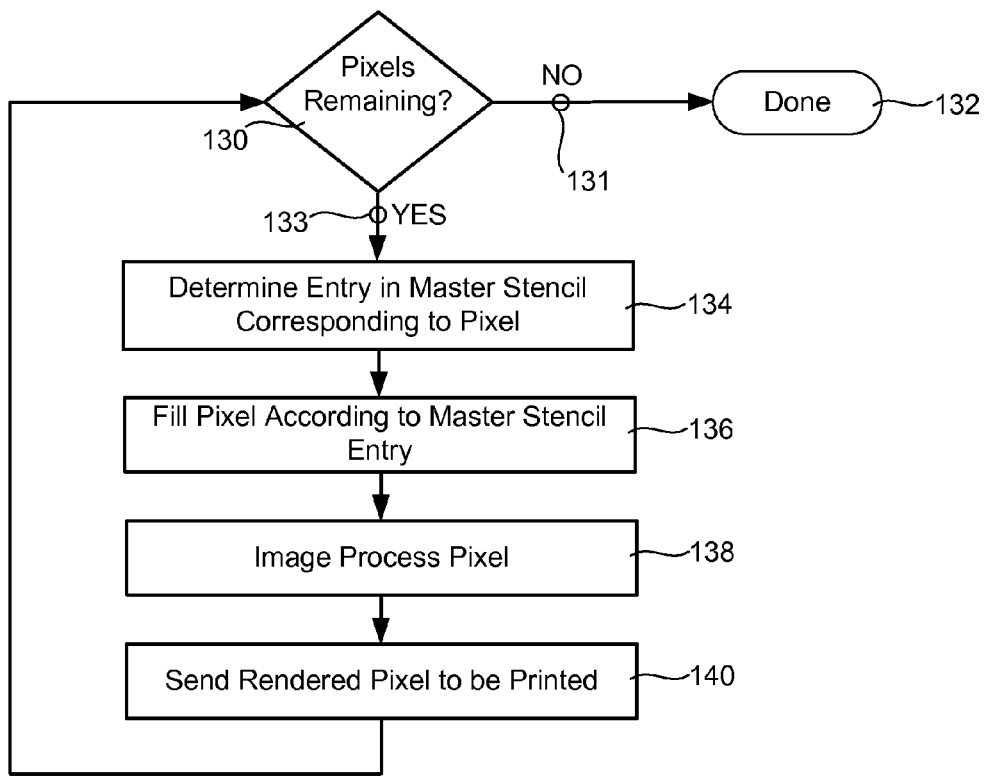
FIG. 13 is a chart showing embodiments of the present invention comprising printing data generated from a master stencil and pixel-based image processing.

Some embodiments of the present invention may be described in relation to FIG. 13. In these embodiments, it may be determined 130 if there are remaining pixels to be rendered. If there are no more pixels 131 to be rendered, then the process may terminate 132. If there are pixels remaining 133 to be rendered, the entry in a master stencil corresponding to the pixel to be rendered may be determined 134. The pixel may be rendered 136 according to the master stencil entry, thereby producing a filled-pixel value. The filled-pixel value may be processed 138 according to one or more pixel-based image processing operations, thereby producing rendered print data. Exemplary pixel-value processing may comprise color correction, filter processing, half toning, compression and other image processing techniques. The rendered print data may be sent 140 to be printed. The "pixels remaining?" condition 130 may be checked and additional pixels may be rendered according to the master stencil and the image processing operations and sent to be printed 140. Some of the embodiments of the present invention described in relation to FIG. 13 may be embodied in a printer driver. Alternative embodiments of the present invention described in relation to FIG. 13 may be embodied in printer firmware.

Figure 14:
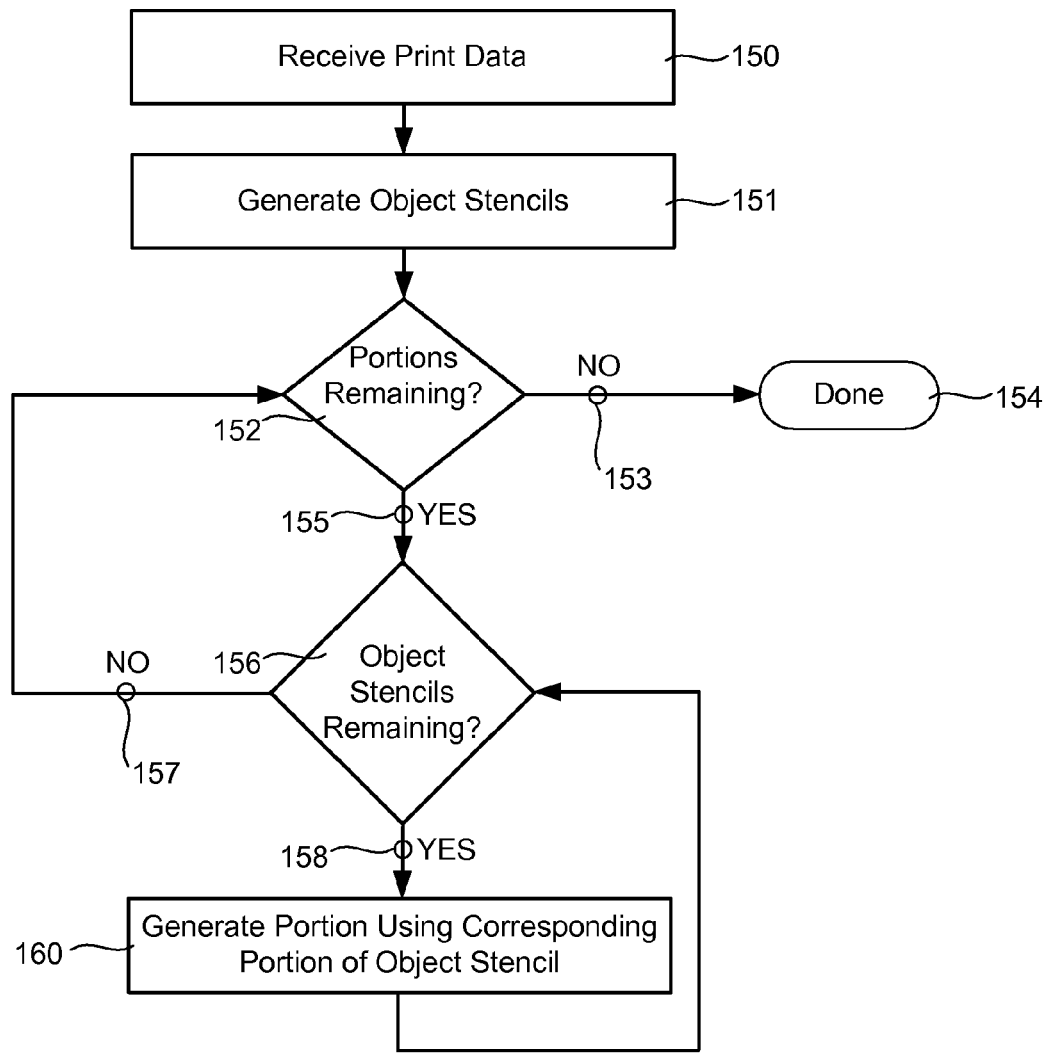
FIG. 14 is a chart showing embodiments of the present invention comprising serial processing of object stencils multiple times to render multiple spatial portions of print data.

Some embodiments of the present invention may be described in relation to FIG. 14. In these embodiments, print data may be received 150, wherein the print data may comprise a plurality of print objects. Object stencils may be generated 151 corresponding to some, or all, of the print objects. A determination may be made 152 if spatial portions of the print data remain to be rendered. In an exemplary embodiment, a portion may correspond to a scan line. If all spatial portions have been rendered 153, the rendering process may terminate 154. If spatial portions of the print data remain 155 to be rendered, then it may be determined 156 whether or not all object stencils have been processed for the current portion. If all object stencils have been processed 157, then any remaining spatial portions may be rendered 152. If an object stencil remains unprocessed 158, then the spatial portion may be generated 160 according to the corresponding portion of the object stencil. In some cases, processing of an object stencil 160 may overwrite a previously generated pixel in the portion being currently processed. In these embodiments, the object stencils may be processed serially for each spatial portion of the print data being rendered, for example, for each scan line. In some embodiments, the objects stencils may be processed in z-order for each portion. In alternative embodiments, the objects stencils may be processed in reverse z-order for each portion. Some of the embodiments of the present invention described in relation to FIG. 14 may be embodied in a printer driver. Alternative embodiments of the present invention described in relation to FIG. 14 may be embodied in printer firmware.

Figure 15:
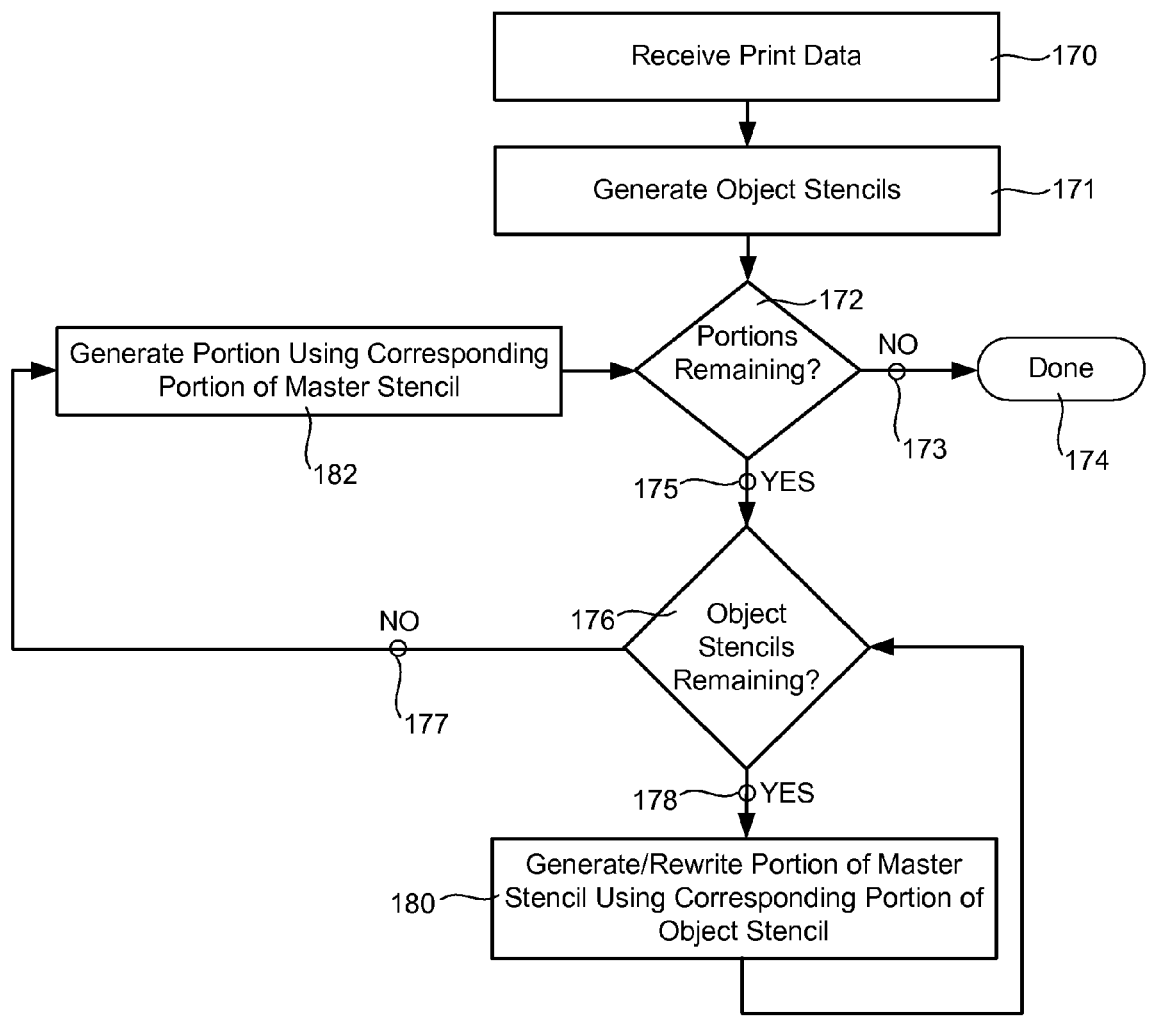
FIG. 15 is a chart showing embodiments of the present invention comprising serial processing of object stencils multiple times to render multiple spatial portions of print data and a master stencil.

Some embodiments of the present invention may be described in relation to FIG. 15. In these embodiments, print data may be received 170, wherein the print data may comprise a plurality of print objects. Object stencils may be generated 171 corresponding to some, or all, of the print objects. A determination may be made 172 if spatial portions of the print data remain to be rendered. In an exemplary embodiment, a spatial portion may correspond to a scan line. If all spatial portions have been rendered 173, the rendering process may terminate 174. If spatial portions of the print data remain 175 to be rendered, then it may be determined 176 whether or not all object stencils have been processed for the current portion. If an object stencil remains unprocessed 178, then a portion of a master stencil may be generated 180 according to the corresponding portion of the current object stencil. In some cases, processing of an object stencil 180 may overwrite a previously generated portion of the master stencil. If all object stencils have been processed 177, then the spatial portion of the print data may be rendered 157 according to the master stencil. In these embodiments, the object stencils may be processed serially for each spatial portion of the print data being rendered, for example, for each scan line. In some embodiments, the objects stencils may be processed in z-order for each portion. In alternative embodiments, the objects stencils may be processed in reverse z-order for each portion. Some of the embodiments of the present invention described in relation to FIG. 15 may be embodied in a printer driver. Alternative embodiments of the present invention described in relation to FIG. 15 may be embodied in printer firmware.

In some embodiments of the present invention, the fill for a graphics object may be described in relation to other graphics objects with overlapping pixels. In some embodiments of the present invention, pixel processing may be done directly based on the master stencil. These embodiments may be understood in relation to FIG. 16.

Figure 16:
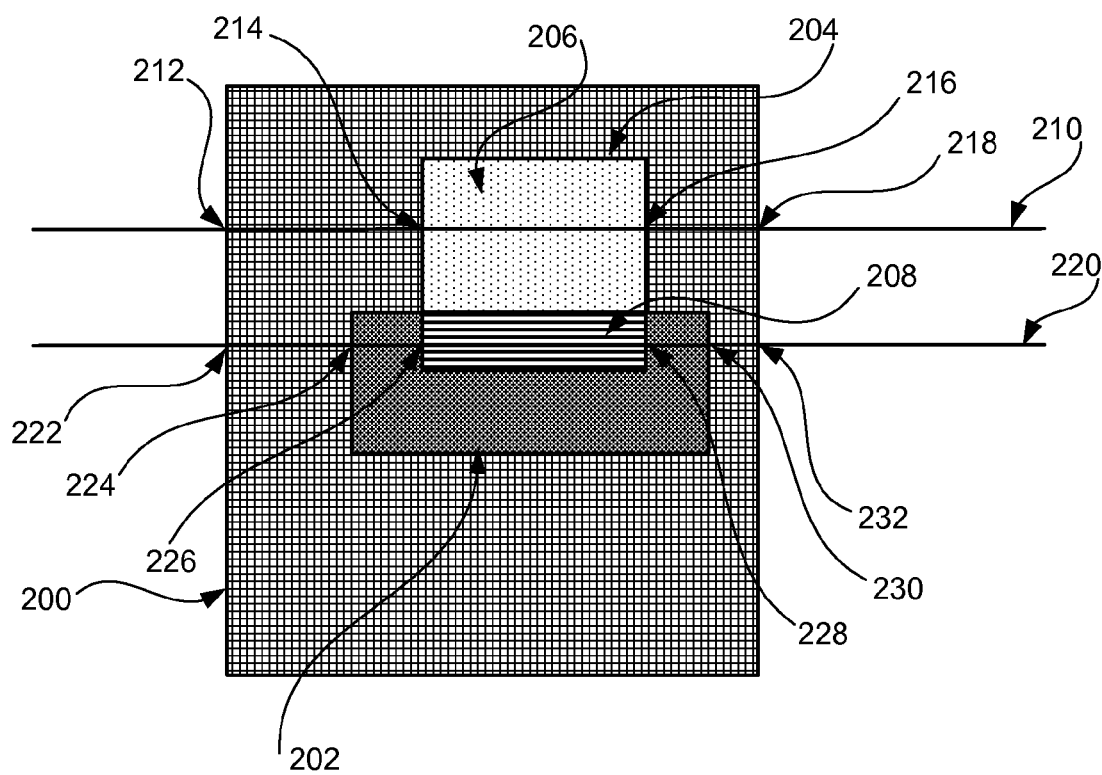
FIG. 16 is a picture illustrating rendering scan lines according to embodiments of the present invention comprising blending.

FIG. 16 illustrates an exemplary region which comprises three graphics objects corresponding to a first rectangle 200, a second rectangle 202 and a third rectangle 204. The fill value for the third rectangle 204 may be based on the graphics objects associated with the underlying rectangles 200, 202. The fill value at a pixel in the portion 206 of the third rectangle 204 which is only overlapping the first rectangle 200 may be based on a fill value associated with the pixel in the first rectangle 200 and a value associated with the third rectangle 204. The value at a pixel in the portion 208 of the third rectangle 204, which is overlapping both the first rectangle 200 and the second rectangle 202, may be based on the fill values at the corresponding pixels in the graphics object corresponding to the first rectangle 200 and the graphics object corresponding to the second rectangle 202, in addition to a value associated with the third rectangle 204.

In some embodiments, the fill value at a pixel location in a graphics object may be a linear, a logical (for example, a raster operation (ROP)), or other, combination of the fill values at the same pixel location in overlapping graphics objects. In these embodiments, a master stencil may comprise a mapping which associates more than one graphics object at a pixel location. In some embodiments, the mapping may comprise an opacity, scaling, blending or other combining factor for each overlapping graphics object.

In some embodiments of the present invention, the processing involved in the rendering of pixel data at a pixel location may be based on the mapping indicated in the master stencil. These embodiments of the present invention may be understood in relation to the exemplary region of FIG. 16. For example, considering the pixels along a first scan line 210, the master stencil mapping may indicate that the pixels starting at a first edge crossing 212 and ending at a second edge crossing 214 may be rendered according to a first object 200. Since these pixels may be directly rendered according to the graphics object corresponding to the first rectangle 200, these pixels may be directly rendered into a color-corrected CMYK color space. The master stencil may map the pixels between the second edge crossing 214 and a third edge crossing 214 to a "blending" of the first rectangle 200 and the third rectangle 204. In some embodiments of the present invention, the "blending" must occur in an RGB color space, and then the blended RGB value may be color corrected into the CMYK color space. The master stencil may map the pixels between the third edge crossing 214 and a fourth edge crossing 216 to the first graphics object 200, and these pixels may be directly rendered into the color-corrected CMYK color space.

In some embodiments of the present invention, the master stencil mapping may alleviate the need to render a pixel in an auxiliary color space. In this example, only "blended" pixels need be rendered in an RGB color space for blending purposes. Pixels which are not a combination of more than one graphics object may be directly rendered in a color-corrected CMYK color space.

A second scan line 220 may be considered for further illustration. The master stencil may map pixels from a first edge crossing 222 to a second edge crossing 224 to the first graphics object 200, and these pixels may be directly rendered in a color-corrected CMYK color space. The master stencil may map pixels from the second edge crossing 224 to a third edge crossing 226 to the second graphics object 222, and these pixels may be directly rendered in the color-corrected CMYK color space. Pixels from the third edge crossing 226 to a fourth edge crossing 228 may be "blended" pixels. These pixels may be a combination of the pixels from the second 202 and third 204 graphics objects. In some embodiments of the present invention, the combination may occur in the RGB color space thereby necessitating rendering the pixel multiple times in the RGB color space according to each graphics object, combining the rendered values and color correcting the blended value. Pixels from the fourth edge crossing 228 to a fifth edge crossing 230 may be directly rendered in the color-corrected CMYK color space according to the second graphics object 202. Pixels from the fifth edge crossing 230 to a sixth edge crossing 232 may be directly rendered in the color-corrected CMYK color space according to the first graphics object 200.

In some embodiments of the present invention, the master stencil may comprise a mapping of print objects, stencils and information for blending, or other combination, for each scan line or portion. A person of ordinary skill in the art can appreciate the numerous ways of indicating such a mapping. In some embodiments of the present invention, processing at a pixel may be based on whether or not a pixel value may be directly rendered or may be rendered as a combination of underlying print objects.

Figure 17:
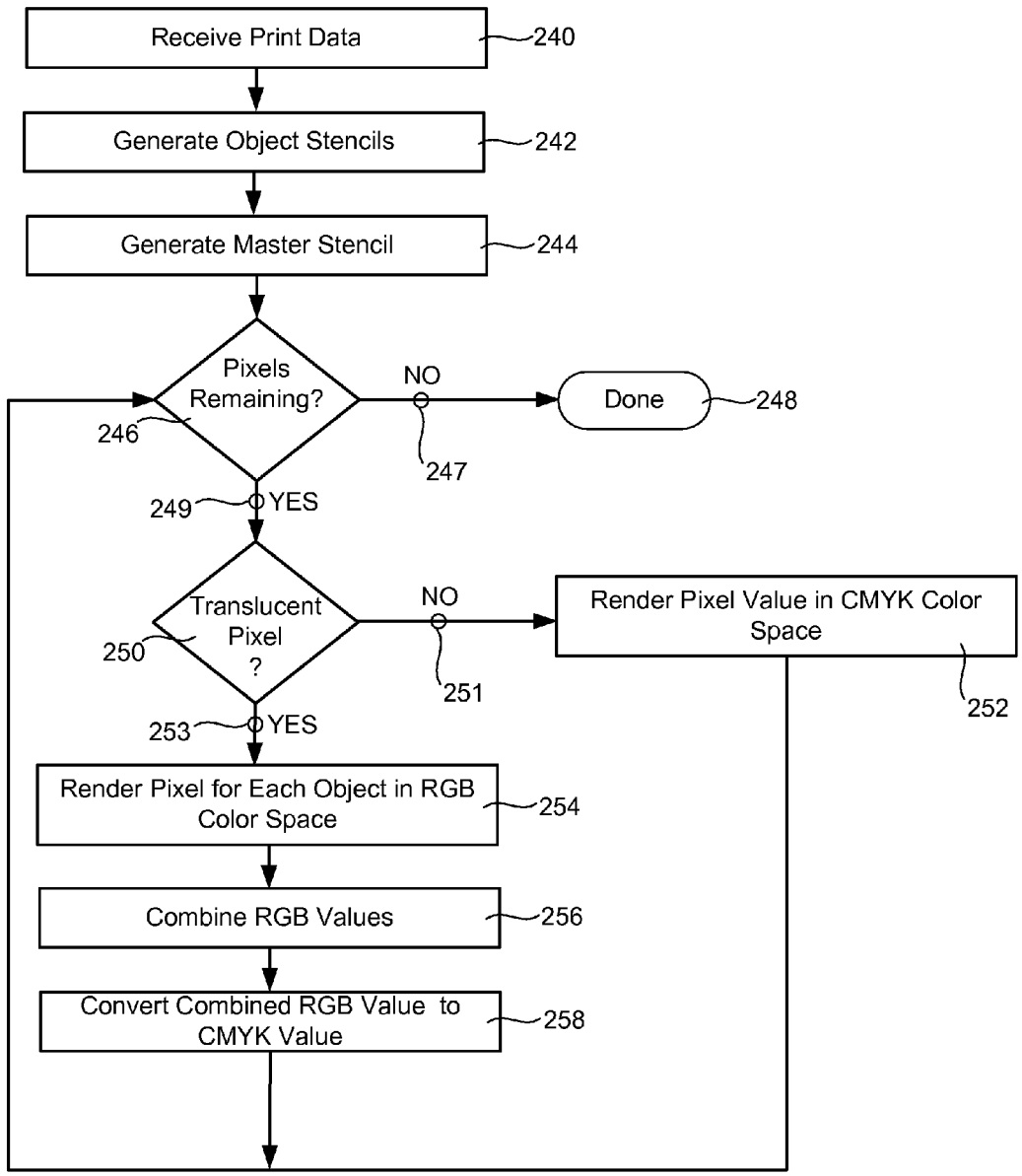
FIG. 17 is a chart showing embodiments of the present invention comprising rendering directly in a color-corrected color space according to the master stencil.

Some embodiments of the present invention, described in relation to FIG. 17, do not require a memory buffer comprising memory for all of the pixels, also considered a surface. These embodiments may render a pixel directly into a color-corrected color space. In these embodiments, print data may be received 240. The print data may comprise print objects. Exemplary print objects include graphics objects, print layers and other print objects generated by print-generating applications. In some embodiments of the present invention, an object stencil may be generated 242 for each of the print objects. In alternative embodiments, an object stencil may be generated 242 for each of some of the print objects. A master stencil may be generated 244 from the object stencils. It may be determined 246 if there are remaining pixels to be rendered. If there are no more pixels 247 to be rendered, then the process may terminate 248. If there are pixels remaining 249 to be rendered, the next pixel may be examined 250 to determine if it is a translucent, or otherwise combined, pixel. The examination 250 may comprise determining the associated entry in the master stencil. If the pixel is not 251 a translucent pixel, then the pixel value may be rendered directly 252 into a color-corrected CMYK color space according to the mapped print object indicated by the master stencil, and then the "pixels remaining?" condition 246 may be checked. If the pixel is 253 a translucent pixel according to the master stencil, then the pixel value according to each object may be generated 254 in an RGB color space. The RGB values may be blended 256, and the blended RGB value may be transformed 258 to the color-corrected CMYK color space. The "pixels remaining?" condition 246 may be checked and additional pixels may be rendered and sent to be printed. Some of the embodiments of the present invention described in relation to FIG. 17 may be embodied in a printer driver. Alternative embodiments of the present invention described in relation to FIG. 17 may be embodied in printer firmware.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for rendering print data corresponding to a first pixel location, said method comprising:
    a) identifying a first pixel location;
    b) determining a first entry in a master stencil corresponding to said first pixel location, wherein said first entry in said master stencil associates said first pixel location with at least one print object; and
    c) producing a first rendered pixel according to said at least one print object.

2. A method according to claim 1, wherein said master stencil comprises an edge list.

3. A method according to claim 1, wherein:
    a) said at least one print object comprises a first print object; and
    b) said first print object is a first graphics object or a first image layer.

4. A method according to claim 1 further comprising:
    a) receiving print data comprising a plurality of print objects, wherein said plurality of print objects comprises said at least one print object;
    b) generating an object stencil for each print object in said plurality of print objects, thereby producing a plurality of object stencils; and
    c) generating said master stencil from said plurality of object stencils.

5. A method according to claim 1, wherein said producing a first rendered pixel further comprises:
    a) generating a first filled-pixel according to said at least one print object; and
    b) processing said first filled-pixel.

6. A method according to claim 5, wherein said processing comprises a process selected from the group consisting of a half-tone process, a compression process, a color-correction process and a filter process.

7. A method according to claim 1 further comprising sending said first rendered pixel to a printer.

8. A method according to claim 1, wherein:
    a) said at least one print object comprises a plurality of print objects; and
    b) said first entry in said master stencil further associates a combining factor with each of said plurality of print objects.

9. A method for rendering print data, said method comprising:
    a) receiving print data, wherein said print data comprises a plurality of print objects;
    b) generating an object stencil for each of said plurality of print objects, thereby producing a plurality of object stencils;
    c) generating a master stencil from said plurality of object stencils, wherein said master stencil maps a first pixel location to at least one print object from said plurality of print objects; and
    d) generating rendered print data corresponding to said first pixel location according to said at least one print object.

10. A method according to claim 9, wherein:
    a) said at least one print object comprises a plurality of print objects; and
    b) said master stencil further associates a combining factor with each of said plurality of print objects.

11. A method as described in claim 9 further comprising sending said rendered print data to a printer.

12. A method as described in claim 9, wherein said generating rendered print data further comprises a process selected from the group consisting of a half-tone process, a compression process, a color-correction process and a filter process.

13. A method as described in claim 9, wherein said generating a master stencil from said plurality of object stencils comprises forming an edge list.

14. A method as described in claim 13 further comprising generating a plurality of scan-line mappings, wherein each of said plurality of scan-line mappings corresponds to a scan-line in said master stencil.

15. A system for rendering print data corresponding to a first pixel, said system comprising:
    a) a pixel identifier for identifying a first pixel;
    b) a stencil-entry identifier for determining a first entry in a master stencil corresponding to said first pixel, wherein said first entry in said master stencil associates said first pixel with at least one print object; and
    c) a pixel renderer for producing a first rendered pixel according to said at least one print object.

16. A system according to claim 15 further comprising:
    a) a print-data receiver for receiving print data comprising a plurality of print objects, said plurality of print objects comprising said at least one print object;
    b) an object stencil generator for generating, for each print object in said plurality of print objects, an object stencil, thereby producing a plurality of object stencils; and
    c) a master-stencil generator for generating said master stencil from said plurality of object stencils.

17. A system according to claim 15, wherein said pixel renderer for producing a first rendered pixel further comprises:
    a) a pixel filler for generating a first filled-pixel according to said at least one print object; and
    b) a pixel processor for processing said first filled-pixel.

18. A system according to claim 17, wherein said pixel processor comprises a process selected from the group consisting of a half-tone process, a compression process, a color-correction process and a filter process.

19. A system for rendering image data, said system comprising:
    a) a print-data receiver for receiving print data, wherein said print data comprises a plurality of print objects;
    b) an object stencil generator for generating a plurality of object stencils, wherein each object stencil in said plurality of object stencils corresponds to a print object in said plurality of print objects;
    c) a master stencil generator for generating a master stencil from said plurality of object stencils; and
    d) a renderer for generating rendered print data using said master stencil and said print data.

20. A system according to claim 19, wherein said renderer for generating rendered print data further comprises:
    a) a pixel filler for generating a first filled-pixel value corresponding to a first pixel location according to at least one print object from said plurality of print objects, said at least one print object associated with said pixel location by said master stencil; and
    b) a pixel processor for processing said first filled-pixel.

21. A system according to claim 20, wherein said pixel processor comprises a half-tone generator.

22. A method for rendering print data, said method comprising:
- a) receiving print data, wherein said print data comprises a plurality of print objects;
- b) generating an object stencil for each of said plurality of print objects, thereby producing a plurality of object stencils;
- c) rendering a first spatial portion, wherein said rendering a first spatial portion comprises accessing each of said object stencils in said plurality of object stencils in a first order; and
- d) subsequent to rendering said first spatial portion, rendering a second spatial portion, wherein said rendering a second spatial portion comprises accessing each of said object stencils in said plurality of object stencils in said first order.

23. A method according to claim 22, wherein said first order is z-order.

24. A method according to claim 22, wherein said first order is reverse z-order.

25. A method according to claim 22 further comprising generating a first spatial-portion mapping, wherein said first spatial-portion mapping comprises combining corresponding spatial portions in said plurality of object stencils.

* * * * *